Sept. 20, 1932.  J. E. PRESTON ET AL  1,878,322
PROCESS AND APPARATUS FOR MANUFACTURING CANDLE HOLDERS
Filed April 1, 1930  5 Sheets-Sheet 1
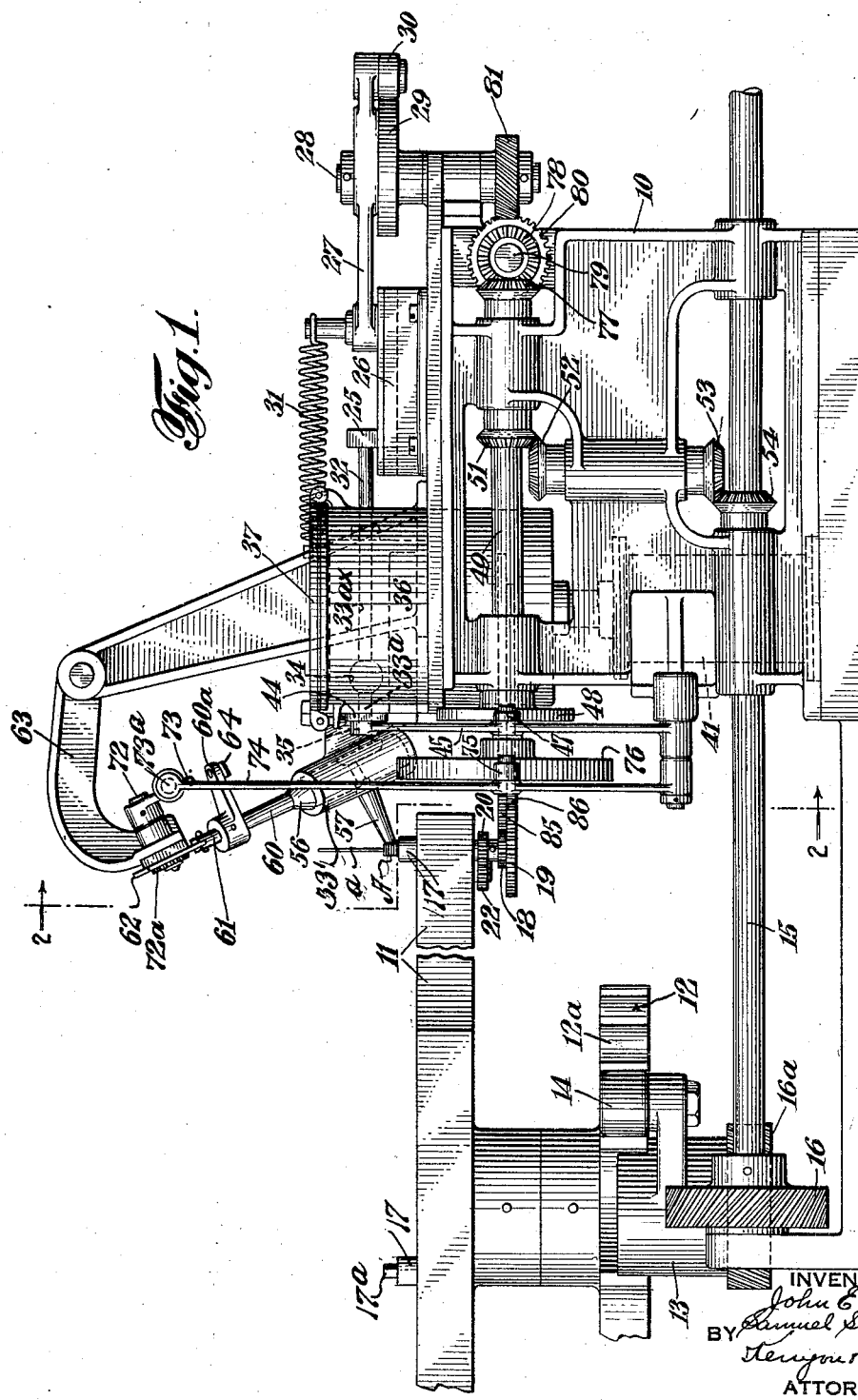
INVENTORS.
John E. Preston
Samuel Sokolow
BY
ATTORNEYS

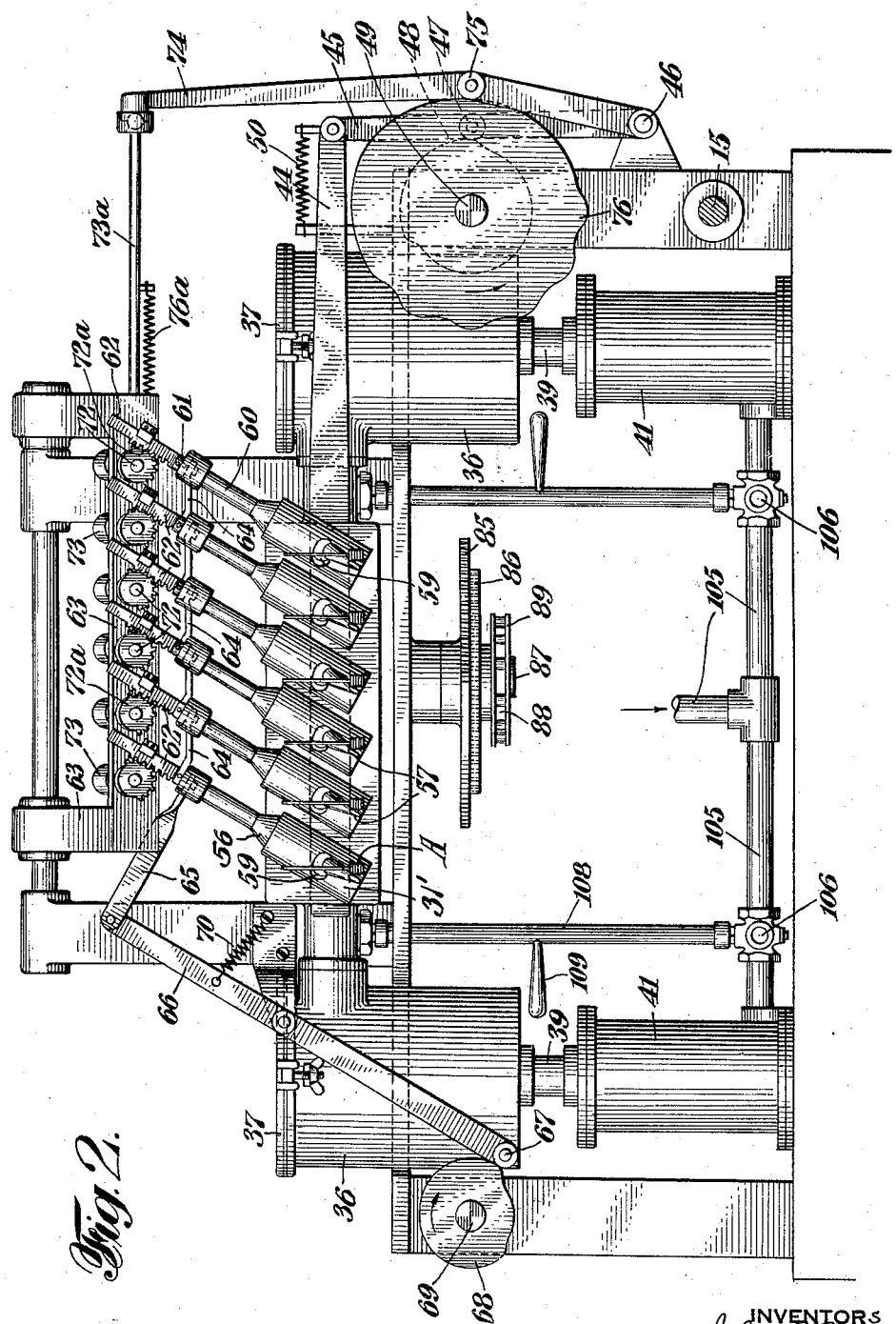

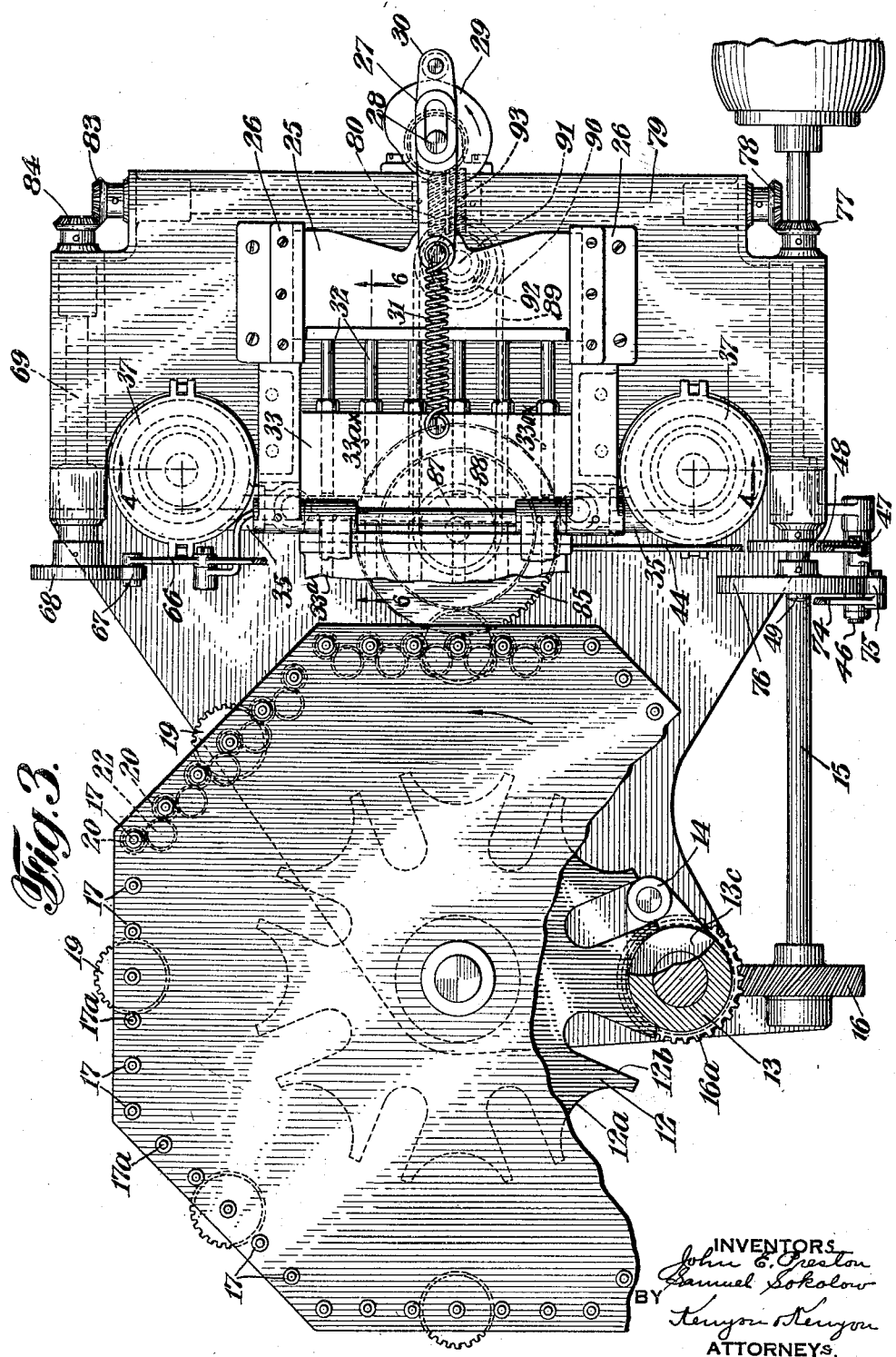

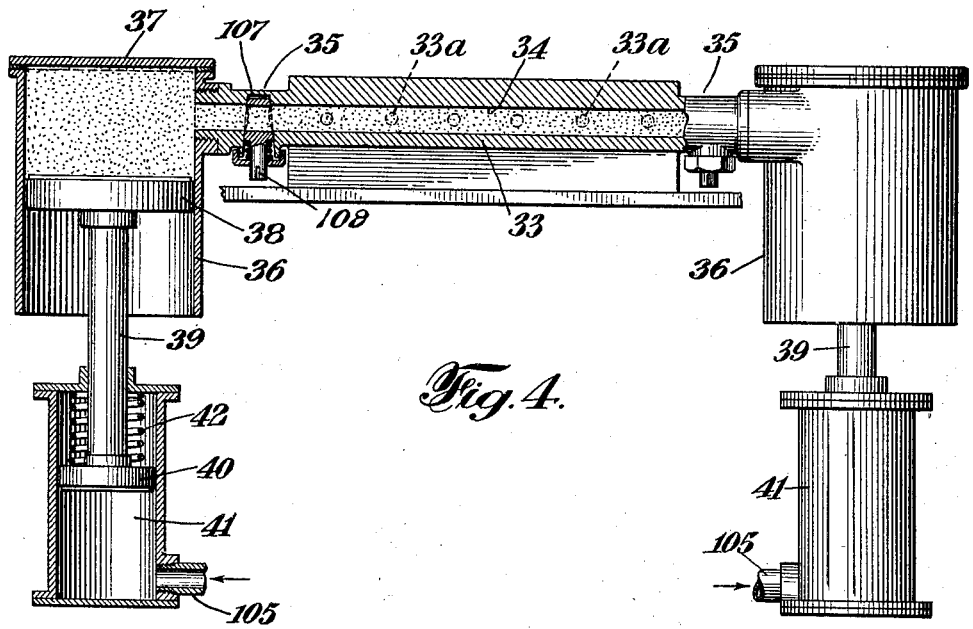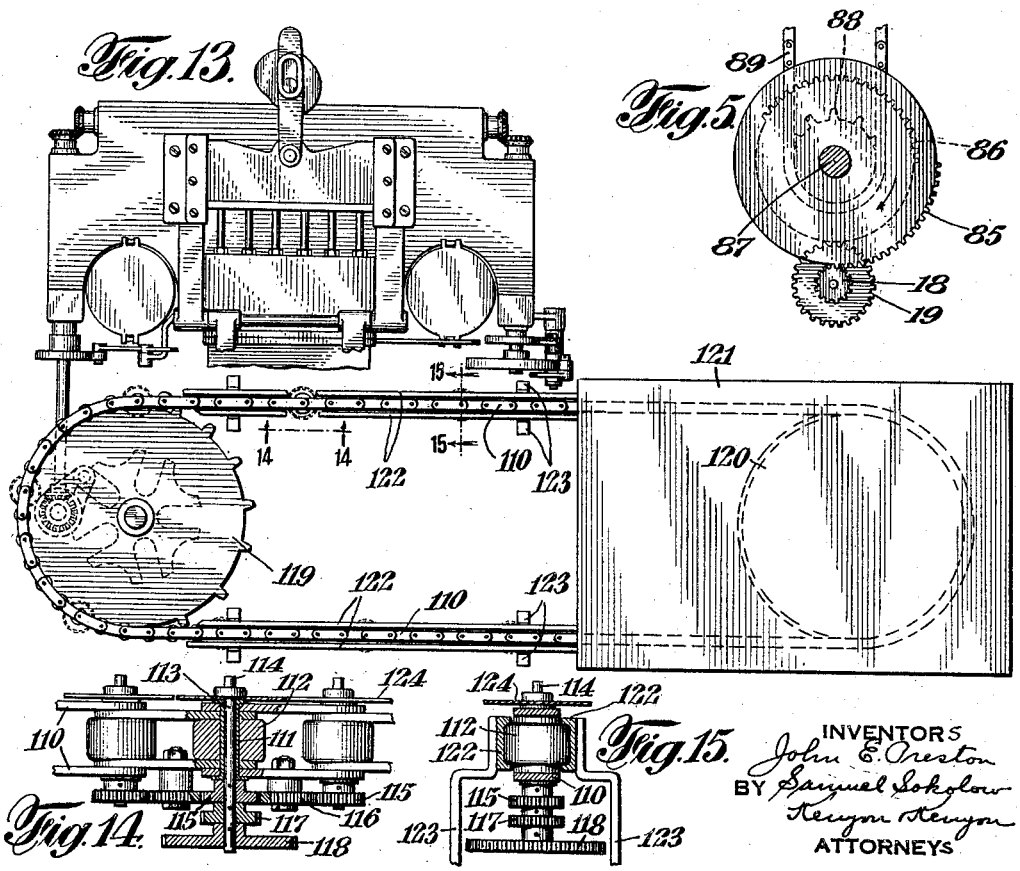

Sept. 20, 1932.  J. E. PRESTON ET AL  1,878,322
PROCESS AND APPARATUS FOR MANUFACTURING CANDLE HOLDERS
Filed April 1, 1930  5 Sheets-Sheet 5
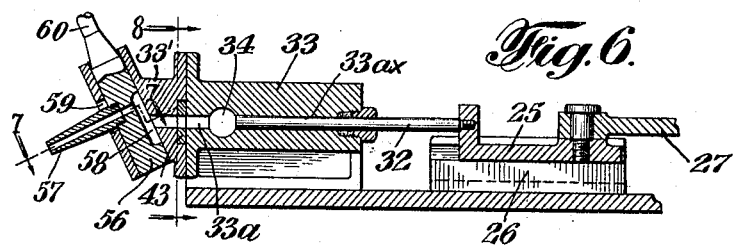
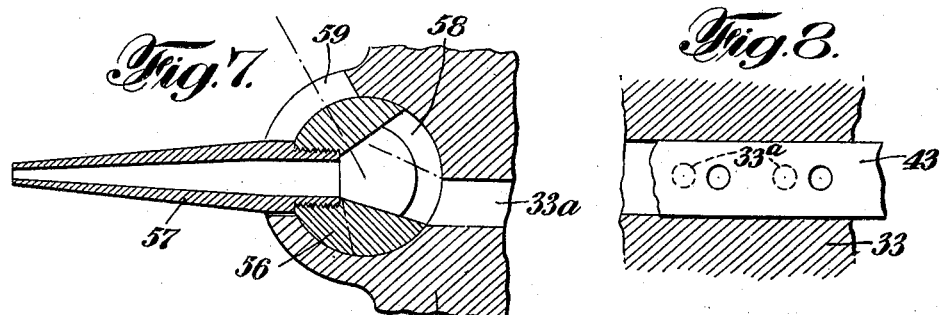
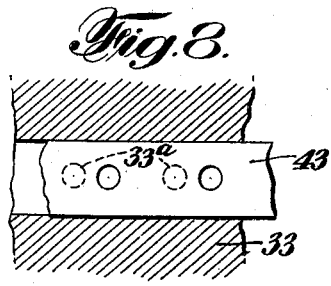
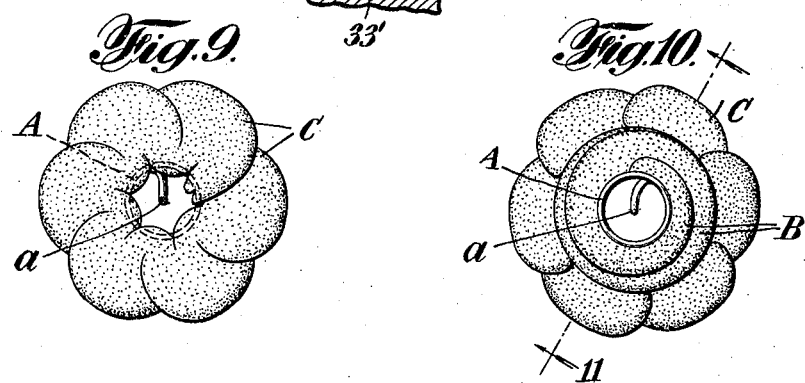
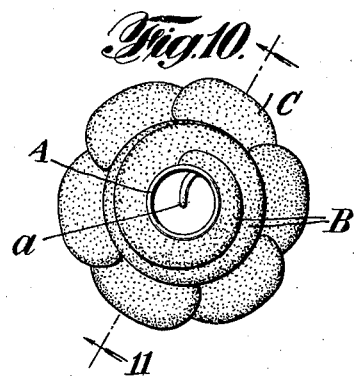
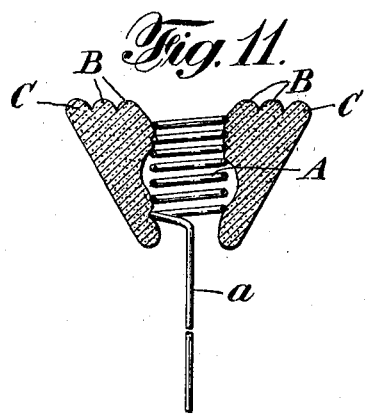
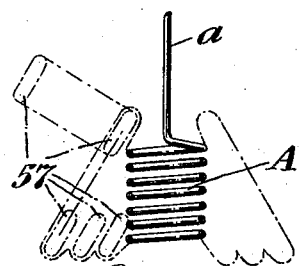
INVENTORS
John E. Preston
Samuel Sokolow
BY Kenyon & Kenyon
ATTORNEYS Patented Sept. 20, 1932

1,878,322

UNITED STATES PATENT OFFICE

JOHN E. PRESTON, OF NEWARK, AND SAMUEL SOKOLOW, OF NORTH BERGEN, NEW JERSEY, ASSIGNORS, BY DIRECT AND MESNE ASSIGNMENTS, OF ONE-HALF TO CYPRESS NOVELTY CORPORATION, OF BROOKLYN, NEW YORK, A CORPORATION OF NEW YORK, AND ONE-HALF TO N. D. Q. SPECIALTY CORPORATION, A CORPORATION OF NEW YORK

PROCESS AND APPARATUS FOR MANUFACTURING CANDLE HOLDERS

Application filed April 1, 1930. Serial No. 440,751.

This invention relates to the manufacture of candle holders or the like.

A common form of candle holder consists of a wire helix or other form having a stem and coated with a composition of icing or the like applied thereto in the form of a rosebud or other flower. The icing or confection is applied to the form while in moist plastic condition and sets or hardens into a strong homogeneous mass of the desired configuration.

An object of this invention is to provide an automatic machine and process for applying plastic material to a form to produce candle holders of the type above referred to.

The invention contemplates a suitable carrier or conveyor on which the forms are mounted and moved to and from one or more nozzles. As the forms are presented to the nozzles, moist plastic material is squirted on to the forms in the desired shape. The forms with the ornamental bodies are then moved away from the nozzles and dried.

A ribbon of plastic material is squirted from a nozzle and is applied to the form while the latter is rotated. The machine comprises means for controlling the feeding of the ribbon from the nozzle, the rotation of the form and the movement of the nozzle to lay the ribbon on the form to produce the desired configuration. The machine also comprises automatic means for bringing forms into position to have the ribbon applied thereto and for removing the same after the application of the plastic material has been completed. The various motions of the different parts are effected through cams and other mechanical devices, the construction and operation of which will later be described in detail.

In one form of machine a chain conveyor is employed which carries the completed holders thru a drier to expedite hardening.

Other objects, novel features and advantages of this invention will be apparent from the following specification and accompanying drawings, wherein Fig. 1 is a side view of a machine embodying one form of the invention;

Fig. 2 is a section substantially on the line 2—2 of Fig. 1;
Fig. 3 is a plan view partially broken away;
Fig. 4 is a section on the line 4—4 of Fig. 3;
Fig. 5 is a fragmentary plan view;
Fig. 6 is a section on the line 6—6 of Fig. 3;
Fig. 7 is a section on the line 7—7 of Fig. 6;
Fig. 8 is a section on the line 8—8 of Fig. 6;
Fig. 9 is a bottom view of a candle stick holder made by the machine;
Fig. 10 is a top view of the same;
Fig. 11 is a section on the line 11 of Fig. 10;
Fig. 12 is a schematic view showing the different positions assumed by the delivery nozzle;
Fig. 13 is a fragmentary plan view of a modified form of the invention with a chain conveyor and drying oven.
Fig. 14 is an elevation partially in section substantially on the line 14—14 of Fig. 13; and
Fig. 15 is a section on the line 15—15 of Fig. 13.

The candle holder formed by this machine is disclosed in Figs. 9, 10 and 11 and consists of a base or form A composed of a wire helix having a stem $a$, which is coated with homogeneous material formed to resemble a flower bud. The coating is applied in plastic condition, but quickly dries and sets into rigid condition. In one form of machine a ribbon of the plastic material is squirted from a nozzle onto the wire coil form while the latter is being rotated. At the start of the operation, the mouth of the nozzle is adjacent the surface of the form, but is gradually moved away therefrom as the material is applied. The form is rotated through approximately two turns, thus laying the ribbon of plastic material in a spiral B. The rotational speed of the form is then decreased and the nozzle is caused to reciprocate along a line inclined to the axis while the form is rotated once, thereby forming the petals C. Rotation of the form is then stopped, the supply of plastic material is shut off and the nozzle is moved still further away so as not to interfere with the removal of the finished candle holder; the finished candle holder is then removed and another form A brought into position. Fig.

12 shows the different positions assumed by the mouth of the nozzle 57, later to be described, in detail, in laying the ribbon on the form.

Referring now to Figs. 1 and 3, 10 is a frame at one end of which is supported a carrier which is in the form of a rotatable table 11. A Geneva wheel 12 having peripheral recesses 12a and radial slots 12b is fixed to the shaft for the table 11 and the frame 10 rotatably supports a driver 13 provided with a pin 14 which is received within the radial slots 12b, and a slot 13c for receiving the edge of the wheel 12 during rotary movement of the latter. The driver 13 is driven from the main shaft 15 through suitable spiral gears 16 and 16a. Rotation of the driver 13 effects step by step rotation of the table 11 in the well-known manner of Geneva wheels.

The table 11 is polygonal and is provided along each edge with a plurality set or group of spindles 17 which are rotatably supported by the table. One of these spindles 17 of each group is provided with pinions 18 and 19 of different diameters. Each spindle 17 carries a gear 20 and idler gears 22 are carried by the plate 11, each idler gear being in mesh with two gears 20 and causing unitary rotation of the spindles of that group. Each spindle is provided with a stud 17a on which a form A is supported, for the purpose of having the plastic material applied thereto.

A horizontally reciprocable plate 25 is supported by the frame 10 and is provided with suitable guides 26. To this plate is connected for instance by a pivot a link 27 having a longitudinal slot through which extends a vertical shaft 28 rotatably supported by the frame 10. A cam 29 is carried by the shaft 28 and is engaged by a roller 30 carried by the link 27. A spring 31 having one end attached to the frame and the other end attached to the plate 25 maintains the follower 30 in contact with the cam 29. The plate 25 carries a series of plungers 32 (see Fig. 6) which extend into bearings 33ax and bores 33a in a head 33 supported by the frame 10. The cam 29 is of such design that the plate 25 is maintained in retracted position during a short portion of the rotation of the cam and during the remaining portion of the cam's rotation the plate is caused once to move forward and back.

In the head 33 there is provided a passage 34 which extends across the bores 33a. The ends of the passage 34 communicate through conduits 35 (see Fig. 4) with reservoirs 36 provided with removable covers 37. In each reservoir 36 there is provided a piston 38 which is connected by a rod 39 with a piston 40 in an air cylinder 41. A spring 42 is interposed between each piston 40 and the end of the corresponding cylinder 41, this spring tending to oppose upward movement of the pistons 40 and 38.

A slide valve 43 is movable across the bores 33a to open and close the same. This valve is connected by a link 44 with the free end of a lever 45 pivotally mounted on a stud 46 supported by the frame (see Fig. 2).

The lever 45 carries a roller 47 which engages the periphery of a cam 48 mounted on a shaft 49 rotatably supported by the frame 10. A spring 50 maintains the lever 45 with the follower 47 in engagement with the periphery of the cam 48. The cam 48 is of such design that during a short portion of the rotation of the cam, the valve is held closed and is held open during the larger remaining portion of the cam's rotation. The shaft 49 carries a bevel gear 51 which meshes with a bevel gear 52 carried by a stub shaft having at its other end a bevel gear 53 which meshes with a bevel gear 54 carried by the main shaft 15.

The head 33 is provided with a plurality of cylindrical valve members 56 (see Figs. 6 and 7) arranged in cylindrical valve chambers formed in extensions 33', each chamber being in communication with one bore 33a. Each valve member 56 is provided with a passage in one end of which is threaded a nozzle 57 and the other end of which communicates with an elongated recess 58 in a surface of the valve member. The nozzle 57 extends through a slot 59 in the wall of the valve chamber thereby permitting both rotation and reciprocation. Each valve member 56 is capable of both rotary and linear axial movement in its chamber. The axes of the members 56 are inclined upwardly toward the table 11 (see Fig. 1) and toward the right (see Fig. 2) so that the nozzles 57 are inclined downwardly toward the table and to the left (see Figs. 1 and 6). The valve members are provided with extensions 60 provided with arms 60a which are connected by swivels 61 with racks 62 slidably supported by a standard 63 projecting from the upper part of the frame 10. The outlet of each nozzle is shaped to produce a ribbon of the desired cross section.

Links 64 connect the free ends of the arms 60a and a link 65 connects one of the arms 60a with one end of a lever 66 which is pivotally supported by the frame intermediate its ends. The other end of the lever 66 is provided with a roller 67 which engages the periphery of a cam 68 carried by the shaft 69 rotatably supported by the frame 10. A spring 70 maintains the follower 67 in engagement with the cam 68. Oscillation of the valve members 56 causes the ends of the nozzles to swing toward and away from the studs 17 along an inclined path. Oscillation of the lever 66 by the cam 68 causes oscillation of the valve members 56. The cam 68 is of such design that for a period of its rotation the valve members 56 are held with the nozzles 57 at the left end of the slot 59, after which they are turned to locate the nozzles at the right end of the slots and then slowly returned to an intermediate position where they are held temporarily and are then returned to the original position. When the members 56 are in their extreme upward position the nozzles are closed off from the conduits 33a.

A plurality of stub shafts 72 are rotatably mounted in the standard 63 and each stub shaft is provided with a pinion 72a which meshes with a rack 62. Each stub shaft is also provided with an arm 73 the free end of which is connected to a pull rod 73a. This pull rod is connected at one end with the free end of a lever 74 rotatably supported by the stub shaft 46 and having a roller 75 which engages the periphery of a cam 76 carried by the shaft 49. A spring 76a is provided for maintaining the follower 75 in engagement with the cam 76.

Reciprocation of the rod 73a effects oscillation of the pinions 72a and consequent reciprocation of the racks 62 and valve members 56. The cam 76 is so designed that at one position the lever 74 is held in position to locate the valve members 56 nearly at the bottom of their strokes. As the cam rotates from this position, the lever 74 moves to bring the valve members to their lowest positions after which they are reciprocated a number of times between their highest positions and their lowest positions. After the final lifting to the upper positions the valve members are gradually returned to the original intermediate positions.

The shaft 49 carries a bevel gear 77 which meshes with a bevel gear 78 carried by a shaft 79 rotatably supported by the frame 10. The shaft 79 carries a spiral gear 80 which meshes with a spiral gear 81 carried by the shaft 28. The shaft 79 also carries a bevel gear 83 which meshes with a bevel gear 84 carried by the shaft 69.

A pair of segmental gears 85 and 86 of different diameters are mounted on the shaft 87 rotatably supported by the frame 10, these gears being adapted to mesh with the pinions 18 and 19 respectively. The shaft 87 also carries a sprocket wheel 88 around which is trained a chain 89 which is also trained around a sprocket wheel 90 carried by a shaft 91 rotatably supported by the frame 10. The shaft 91 also carries a spiral gear 92 which meshes with a spiral gear 93 carried by the shaft 79.

The bases of the cylinders 41 are connected by pipes 105 with a supply of compressed air and three-way valves 106 are provided for controlling the admission of air to the cylinders. When the valves cut off the air supply, they also open the cylinders to the atmosphere. In each conduit 35 there is provided a valve 107 which controls communication between the reservoirs 36 and the passage 34.

The valves 106 and 107 are provided with a common operating rod 108 having a handle 109. The arrangement is such that operation of a handle 109 either opens or closes both of the valves to which the rod 108 is connected.

The operation of the machine is as follows:

Assume that the various elements are in the positions which they occupy at the beginning of a cycle, these positions being those shown in the drawings. The reservoirs 36, passage 34 and bores 33a are filled with freely flowing, self-hardening, homogeneous, plastic material, such as icing and the pistons 40 are pushed upwardly by air in the cylinders, thus causing the pistons 38 to exert pressure on the plastic material (Fig. 4). The slide valve 43 is closed, the valve members 56 are near the bottom of their paths and the nozzles 57 are at the right ends of the slots 59 and their ends are adjacent the forms A (Fig. 2). The plate 25 is in its retracted position (Fig. 3). Wire forms A are mounted on the studs 17a of the row of spindles directly in front of the head 33 (Figs. 1 and 3). The roller 14 is just leaving a slot 12b and the driver 13 locks the Geneva wheel 12 against rotation (Fig. 3). The gear 85 is just ready to engage the pinion 18. (Fig. 5).

The cycle of operation is as follows:

The cam 29 rotates to permit the spring 31 to draw forward the plate 25 and advance the plungers 32 across the passage 34, thereby driving the plungers 32 through the bores 33a. The slide valve 43 is then moved by the spring 50 to permit flow of plastic material through the nozzles 57 and the plungers 32 are advanced further and force measured amounts of plastic material through the nozzles 57, the cam 48 being rotated sufficiently to permit the necessary movement to the left of the upper end of the lever 45. The spindles 17 are rotated in unison at a relatively high speed by the segmental gear 85 and pinions 18, 20 and 22, and a flat ribbon of plastic material is laid spirally around the lower end of the form A until approximately two full turns have been made. During this period, the valve members 56 have been rotated slightly through the medium of the spring 70, lever 66, link 65 and arms 60a, this movement being permitted by rotation of the cam 68. The valve members 56 are thus rotated to move the lower ends of the nozzles 57 radially of the forms A after the first layer of icing has been applied so that the nozzles will not strip off from the forms the plastic material previously applied. Because of the inclination of the valve members 56, their rotation causes a slight upward movement of the lower ends of the nozzles. This upward movement is compensated by downward movement of the extensions 60 so that the elevation of the nozzles remains constant. The downward movement of the extensions 60 is effected through the medium of the spring 76a, arm 73, rod 73a, pinions 72a and racks 62, the rotation of cam 76 permitting such movement. After the spindles have been twice rotated and the foundation B laid, the segmental gear 85 moves out of mesh with the pinion 18 and the segmental gear 86 meshes with the pinion 19 and the spindles are driven at a considerably lower speed through a single rotation. The valve members 56, together with the nozzles 57, are now caused to reciprocate by engagement of the follower 75 with the high spots on the cam 76.

The ribbon of plastic material is thus laid back and forth in scallop form along the foundation B to form the petals C. After one complete revolution of the spindles, the valve members 56 are held in raised position and are swung to locate the nozzles in the upper ends of the slots 59, thereby shutting off the nozzles from the bores 33a. At the same time, the plate 25 is retracted and the slide valve 43 closed. Upon the withdrawal of the plungers 32, additional plastic material is forced into the bores 33a and passage 34 from the reservoirs 36. Next, the roller 14 engages another slot 12b and advances the table 11 to bring another set of spindles in front of the head 33, these spindles previously having had forms A mounted thereon. The nozzles 57 are in such position that their ends are located above the completed articles and therefore are out of their path of movement. While the table is being advanced one step, the valve members 56 are returned to their original position to locate the ends of the nozzles 57 adjacent the forms A and the various other elements assume their starting position for a new cycle.

When either of the reservoirs 36 becomes empty, the corresponding handle 109 is actuated to close the valves 106 and 107. The cylinder 41 is thereby opened to the atmosphere and the pistons 40 and 38 are returned to their low position after which the cover 37 may be removed and the reservoir 36 filled with fresh plastic material. The handle 109 is then again operated to open the valves 106 and 107.

It will be seen that the table serves as a carrier or conveyor for a series or number of groups of holders for the wire forms which are successively moved into cooperative relation to the squirting nozzles. The forms and nozzles are intermittently given the necessary relative movements for applying the plastic material to successive groups of forms. The completed candle holders are then removed and allowed to harden before packing.

By reason of the fact that the rotating spindle engages the socket portion of the form instead of the stem it is not necessary to have the stem coaxial with the socket as it is when the rotative force is applied to the stem.

The withdrawal of the plungers 32 is so timed as to start before the slide valve 43 is actuated to shut off communication between the bores 33a and the nozzles 57. This creates a slight suction which draws back into the nozzles any plastic material protruding beyond the end thereof. This prevents the formation of a drop of plastic material at the end of the nozzle. The valve 43 is closed before communication is established between the outer ends of bores 33a and passage 34.

The modification disclosed in Figs. 13, 14, and 15 utilizes a chain carrier 110 as a means for supporting the form A. The links of this chain are connected by means of bushings 111 on which are rotatably mounted the rollers 112. In each bushing 111 there is rotatably mounted a spindle 113 having a stud 114 for supporting a form A. Each of the spindles carries a pinion 115 and idler pinions 116 are provided for causing simultaneous rotation of a group of six spindles. Every sixth spindle is provided with pinions 117 and 118 which are of proper size to mesh with the segmental gears 85 and 86 such as previously described. The chain is supported by two sprocket wheels 119 and 120 of which 119 is driven by a Geneva movement and 120 is mounted in a dryer 121. Between the sprocket wheels 119 and 120 the chain is supported by guides 122 mounted on brackets 123. Plates 124 are carried by pairs of spindles and overlie the chain to prevent dirt falling into the chain.

The operation of this modification is similar to the operation of the previously described construction. Successive groups of spindles with wire forms supported thereon are brought into co-operative relationship to a set of nozzles and after the plastic material has been applied they are moved along sufficiently to permit another set of wire forms to be brought into operative position. The holders are intermittently advanced in this manner and the finished product carried through the dryer 121. By using the chain type of carrier, any desired length of time for loading, drying and unloading may be provided.

It is of course understood that various other modifications may be made in the apparatus above described, without in any way departing from the spirit of the invention as defined in the appended claims.

We claim:

1. In combination, a rotatable support for a form, means to rotate said support at different speeds, a nozzle for squirting a ribbon of plastic material onto said form, and means to move said nozzle radially and axially of said support in timed relation to the rotation thereof.

2. In combination, a rotatable support for a form, a nozzle for squirting a ribbon of plastic material onto said form, said nozzle being supported for reciprocatory and swinging movement, means to rotate said support at different speeds, and means to swing the end of said nozzle radially of said support and to reciprocate said nozzle axially of the support in timed relation to the rotation thereof.

3. In combination, a rotatable spindle for supporting a form, a pair of pinions of different diameter carried by said spindle, coaxial segmental gears adapted successively to register with said pinions, means to rotate said segmental gears at constant speed to effect rotation of said spindle at different speeds, a nozzle for squirting a ribbon of plastic material onto said form, said nozzle being supported for reciprocating and swinging movement, and means to swing said nozzle radially of said spindle and to reciprocate said nozzle axially of said spindle in timed relationship to the rotation of said spindle.

4. In combination, a rotatable support, means to rotate said support at different speeds, a nozzle, and means to move said nozzle radially of said support and axially thereof during the period of low speed rotation.

5. In combination, a rotatable support for a form, a nozzle for squirting plastic material onto said form, means to rotate said support for a period at a predetermined speed and for a subsequent period at a lower speed, means to move said nozzle radially of said support during the period of high speed rotation and to reciprocate the same axially of the support during the period of low speed rotation.

6. In combination, a rotatable support for a form, a nozzle for squirting a ribbon of plastic material onto said form, said nozzle being supported for reciprocatory and swinging movement, means to rotate said support for a period at a predetermined speed and for a subsequent period at a lower speed, means to swing the end of said nozzle radially of said support during the period of high speed rotation and to reciprocate said nozzle axially of the support during the period of low speed rotation.

7. In combination, a spindle for supporting a form, a pair of pinions of different diameter carried by said spindle, coaxial segmental gears adapted to mesh with said pinions, means to rotate said segmental gears at constant speed to effect rotation of said spindle at different speeds, a nozzle for squirting a ribbon of plastic material onto said form, means to swing said nozzle radially of said spindle during the period of high speed rotation and axially thereof during the period of low speed rotation.

8. In combination, a rotatable spindle for supporting a form, a pair of pinions of different diameter carried by said spindle, coaxial segmental gears adapted successively to mesh with said pinions, means to rotate said segmental gears at constant speed to effect rotation of said spindle for a period at a given speed and for a subsequent period at a lower speed, a nozzle for squirting a ribbon of plastic material onto said form, means to swing said nozzle radially of said spindle during the period of high speed rotation and to reciprocate the same axially of the spindle during the period of low speed rotation.

9. In combination, a rotatable spindle for supporting a form, a pair of pinions of different diameter carried by said spindle, coaxial segmental gears adapted successively to mesh with said pinions, means to rotate said segmental gears at constant speed to effect rotation of said spindle for a period at a given speed and for a subsequent period at a lower speed, a nozzle for squirting a ribbon of plastic material onto said form, said nozzle being supported for reciprocating and swinging movement, means to swing said nozzle radially of the spindle during the period of high speed rotation and to effect reciprocation of the nozzle axially of the spindle during the period of low speed rotation.

10. In combination a support, a row of spindles rotatably carried thereby, said spindles having provision for supporting forms, means to effect unitary rotation of said spindles at different speeds, a plurality of nozzles for squirting ribbons of plastic material on said forms, means to move said nozzles radially of said spindles during the period of high speed rotation and axially thereof during the period of low speed rotation, and means to move said support to bring said spindles into and out of operative relation with the means for rotating the same.

11. In combination a table, a row of spindles rotatably carried thereby, said spindles having provision for supporting forms, means for effecting unitary rotation of said spindles, for a period at a predetermined speed and for a subsequent period at a lower speed, nozzles for applying ribbons of plastic material to said forms, means to move said nozzles radially of said spindles during the period of high speed rotation and to reciprocate said nozzles axially of the support during the period of low speed rotation, and means to move said support to bring said spindles into and out of operative relationship with the means for rotating the same.

12. In combination a support, a row of spindles rotatably carried thereby and having provision for supporting forms, nozzles for squirting ribbons of plastic material onto said forms, said nozzles being supported for reciprocatory and swinging movement, means to effect unitary rotation of said spindles for a period at a predetermined speed and for a subsequent period at a lower speed, means to swing the ends of said nozzles radially of said spindles during the period of high speed rotation and to reciprocate said nozzles axially of the spindles during the period of low speed rotation, and means to move said support to bring said spindles into and out of operative relationship with the means for rotating the same.

13. In combination a support, a plurality of spindles rotatively carried by said support, said spindles having provision for supporting forms, means for effecting unitary rotation of the spindles, a pair of pinions of different diameters carried by one of said spindles, co-acting segmental gears adapted successively to mesh with said pinions, means to rotate said segmental gears at constant speed to effect rotation of said spindles at different speeds, nozzles for squirting ribbons of plastic material onto said forms, means to move said nozzles radially of said spindles during the period of high speed rotation and axially thereof during the period of low speed rotation, and means to move said support to bring said pair of pinions into and out of operative relationship with said segmental gears.

14. In combination a support, a plurality of spindles rotatably carried by said support, said spindles having provision for supporting forms, means for effecting unitary rotation of said spindles, a pair of pinions of different diameter carried by one of said spindles, co-axial segmental gears adapted successively to mesh with said pinions, means to rotate said segmental gears at constant speed to effect rotation of said spindles for a period at a given speed and for a subsequent period at a lower speed, nozzles for squirting ribbons of plastic material onto said forms, means to swing said nozzles radially of said spindles during the period of high speed rotation and to reciprocate the same axially of the spindles during the period of low speed rotation, and means to move said support to bring said pair of pinions into and out of relationship to said segmental gears.

15. In combination a support, a plurality of spindles rotatably carried thereby, said spindles having provisions for supporting forms, means for effecting unitary rotation of said spindles, a pair of pinions of different diameter carried by one of said spindles, co-axial segmental gears adapted successively to mesh with said pinions, means to rotate said segmental gears at constant speed to effect rotation of said spindles for a period at a given speed and for a subsequent period at a lower speed, nozzles for squirting ribbons of plastic material onto said forms, said nozzles being supported for reciprocatory and swinging movement, means to swing said nozzles radially of said spindles during the period of high speed rotation and to effect reciprocation of the nozzles axially of the spindles during the period of low speed rotation, and means for moving said support to bring said pair of pinions into and out of operative relationship to said segmental gears.

16. In combination a rotatable table, a plurality of rows of rotatable spindles carried by said table, means for effecting unitary rotation of said spindles at different speeds, means periodically to rotate said table to bring successive rows into and out of operative relationship to the spindle rotating means, nozzles for squirting ribbons of plastic material onto said forms, and means to move said nozzles radially of said spindles during the period of high speed rotation and axially of the spindles during the period of low speed rotation.

17. In combination a rotatable table, a plurality of rows of spindles rotatably carried by said table, said spindles having provision for supporting forms, means for effecting unitary rotation of a row of spindles for a period at a given speed for a subsequent period at a lower speed, means periodically to rotate said table to bring successive rows of spindles into and out of operative relationship with the spindle rotating means, nozzles for squirting ribbons of plastic material onto said forms, and means to move said nozzles radially of said spindles during the period of high speed rotation and axially thereof during the period of low speed rotation.

18. In combination, a rotatable table, a plurality of rows of spindles rotatably carried by said table, said spindles having provision for supporting forms, means for effecting unitary rotation of a row of spindles for a period at different speeds and means periodically to rotate said table to bring successive rows of spindles into and out of operative relationship with the spindle rotating means, nozzles for squirting ribbons of plastic material onto said forms, and means to move said nozzle radially and axially of said spindles in timed relation to the rotation thereof.

19. In combination, a rotatable table, a plurality of rows of spindles rotatably carried by said table, said spindles having provision for supporting forms, means for effecting unitary rotation of a row of spindles for a period at a given speed and for a subsequent period at a lower speed, means periodically to rotate said table to bring successive rows of spindles into and out of operative relationship with the spindle rotating means, nozzles for squirting ribbons of plastic material onto said form, said nozzles being supported for reciprocatory and swinging movement and means to swing the ends of said nozzles radially of said spindles during the period of high speed rotation and to reciprocate said nozzles axially of said spindles during the period of low speed rotation.

20. In combination, a rotatable table, a plurality of rows of spindles rotatably carried by said table, said spindles having provision for supporting forms, means for effecting unitary rotation of a row of spindles, a pair of pinions of different diameters carried by one of said spindles, co-axial segmental gears adapted successively to mesh with said pinions, means to rotate said segmental gears at constant speed to effect rotation of said spindles at different speeds, means periodically to rotate said table to bring the pinions of successive rows of spindles into and out of operative relationship with the segmental gears, nozzles for squirting ribbons of plastic material onto said forms, and means to move said nozzles radially and axially of said spindles in timed relation to the rotation thereof.

21. In combination, a rotatable table, a plurality of rows of spindles rotatably carried by said table, said spindles having provision for supporting forms, means for effecting unitary rotation of a row of spindles, a pair of pinions of different diameters carried by one of said spindles, co-axial segmental gears adapted successively to mesh with said pinions, means to rotate said segmental gears at constant speed to effect rotation of said spindles at different speeds, means periodically to rotate said table to bring the pinions of successive rows of spindles into and out of operative relationship with the segmental gears, nozzles for squirting ribbons of plastic material onto said forms, and means to move said nozzles radially of said spindles during the period of high speed rotation and axially thereof during the period of low speed rotation.

22. In combination a rotatable table, a plurality of rows of spindles rotatably carried by said table, said spindles having provision for supporting forms, means for effecting unitary rotation of a row of spindles, a pair of pinions of different diameters carried by one of said spindles, coaxial segmental gears adapted successively to mesh with said pinions, means to rotate said segmental gears at constant speed to effect rotation of said spindles for a period at a given speed and for a subsequent period at a lower speed, means periodically to rotate said table to bring the pinions of successive rows into and out of operating relationship with the segmental gears, nozzles for squirting ribbons of plastic material onto said forms, said nozzles being supported for reciprocatory and swinging movement and means to swing said nozzles radially of said spindles and to move said nozzles axially thereof in timed relation to the rotation of the spindles.

23. In combination, a rotatable table, a plurality of rows of spindles rotatably carried by said table, said spindles having provision for supporting forms, means for effecting unitary rotation of a row of spindles, a pair of pinions of different diameters carried by one of said spindles, coaxial segmental gears adapted successively to mesh with said pinions, means to rotate said segmental gears at constant speed to effect rotation of said spindles for a period at a given speed and for a subsequent period at a lower speed, means periodically to rotate said table to bring the pinions of successive rows of spindles into and out of operative relationship with the segmental gears, nozzles for squirting ribbons of plastic material onto said forms, said nozzles being supported for reciprocatory and swinging movement, and means to swing said nozzles radially of said spindles during the period of high speed rotation and remove said nozzles axially of the spindles during the period of low speed rotation.

24. In combination, a rotatable support for a form, means to rotate said support at different speeds, a nozzle for squirting a ribbon of plastic material onto said form, means to move said nozzle radially of said support during the period of high speed rotation and axially thereof during the period of low speed rotation, and means to project a measured amount of plastic material through said nozzle.

25. In combination, a rotatable support for a form, means to rotate said support at different speeds, a nozzle for squirting a ribbon of plastic material onto said form, means to move said nozzle radially and axially of said support in timed relation to the rotation thereof, and means to project a measured amount of plastic material through said nozzle.

26. In combination, a rotatable support for a form, a nozzle for squirting a ribbon of plastic material onto said form, said nozzle being supported for reciprocatory and swinging movement, means to rotate said support for a period at a given speed and for a subsequent period at a lower speed, means to swing the end of said nozzle radially of said support and to reciprocate said nozzle axially of the support in timed relation to the rotation thereof, and means to project a measured amount of plastic material through said nozzle.

27. In combination a rotatable support for a form, a nozzle for squirting a ribbon of plastic material onto said form, said nozzle being supported for reciprocatory and swinging movement, means to rotate said support for a period at a given speed and for a subsequent period at a lower speed, means to swing the end of said nozzle radially of said support during the period of high speed rotation and to reciprocate said nozzle axially of the support during the period of low speed rotation, and means to project a measured amount of plastic material through said nozzle.

28. In combination a rotatable spindle for supporting a form, a pair of pinions of different diameters carried by said spindle, coaxial segmental gears adapted successively to mesh with said pinions, means to rotate said segmental gears at constant speed to effect rotation of said spindle at different speeds, a nozzle for squirting a ribbon of plastic material onto said form, said nozzle being supported for reciprocating and swinging movement, means to swing said nozzle radially of the spindle and to reciprocate said nozzle axially of the spindle in timed relation to the rotation of the spindle, and means to project a measured amount of plastic material through said nozzle.

29. In combination, a support, a plurality of spindles rotatably carried thereby, said spindles having provision for supporting forms, means for effecting unitary rotation of said spindles, a pair of pinions of different diameter carried by one of said spindles, coaxial segmental gears adapted successively to mesh with said pinions, means to rotate said segmental gears at constant speed to effect rotation of said spindles at different speeds, means for moving said support to bring said pair of pinions into and out of operative relationship to said segmental gears, nozzles for squirting ribbons of plastic material onto said form, said nozzles being supported for reciprocatory and swinging movement, and means to swing said nozzles radially of said spindles and to effect reciprocation of said nozzles axially of said spindles in timed relation to the rotation of the spindles, and means to project measured amounts of plastic material through said nozzles.

30. In combination a rotatable table, a plurality of rows of spindles rotatably carried by said table, said spindles having provision for supporting forms, means for effecting unitary rotation of a row of spindles at different speeds, means periodically to rotate said table to bring successive rows of spindles into and out of operative relationship with the spindles rotating means, nozzles for squirting ribbons of plastic material onto said forms, means to move said nozzles radially of said spindles and to reciprocate said nozzles axially of said spindles in timed relation to the rotation of the spindles, and means for projecting measured quantities of plastic material through said nozzle.

31. In combination a rotatable table, a plurality of rows of spindles rotatably carried by said table, said spindles having provision for supporting forms, means for effecting unitary rotation of a row of spindles for a period at a given speed and for a subsequent period at a lower speed, means periodically to rotate said table to bring successive rows of spindles into and out of operative relationship with the spindle rotating means, nozzles for squirting ribbons of plastic material onto said forms, means to move said nozzles radially of said spindles during the period of high speed rotation and axially thereof during the period of low speed rotation, and means to project measured quantities of plastic material through said nozzles.

32. In combination, a rotating spindle having provision for supporting a form, means for rotating said spindle, a reciprocatory and rotatable member, a nozzle carried by said member, a conduit, said member having a passage communicating with said nozzle and said conduit, and means for rotating and reciprocating said member in timed relation to the rotation of said spindle.

33. In combination a rotatable spindle having provision for supporting a form, a conduit, a member mounted for rotation and reciprocation, a nozzle carried by said member for applying to said form a ribbon of plastic material, said member having a passage communicating with said nozzle and said conduit, means for projecting plastic material through said conduit, and means for rotating said member to swing said nozzle axially of said spindle during its period of high speed rotation and to reciprocate said member to move said nozzle axially of said spindle during its period of low speed rotation.

34. In combination a conduit having a chamber, means for supplying plastic material to said chamber, a piston slidable in said conduit, means to actuate said piston, a nozzle in communication with said conduit, a rotatable spindle having provision for supporting a form on which plastic material is applied from said nozzle, means to rotate said spindle and means to move said nozzle radially and axially of said spindle in timed relation thereto.

35. In combination a conduit having a chamber, means for supplying plastic material to said chamber, a piston slidable in said conduit, means to actuate said piston, a nozzle in communication with said conduit, a rotatable spindle having provision for supporting a form on which plastic material is applied from said nozzle, means to rotate said spindle for a period at a given speed and for a subsequent period at a lower speed, and means to move said nozzle radially of said spindle during the period of high speed rotation and to reciprocate said nozzle axially of said spindle during the period of low speed rotation.

36. In combination a chamber, means for supplying plastic material to said chamber, a plurality of conduits traversing said chamber, pistons slidable in said conduits, nozzles in communication with said conduits, rotatable spindles having provision for supporting forms to which the plastic material is applied from said nozzles, means to rotate said spindles, means to move said nozzles radially and axially of said spindles, means to actuate said pistons and means for actuating said three last named means in timed relation.

37. In combination a chamber, means for supplying plastic material to said chamber, a plurality of conduits traversing said chamber, pistons slidable in said conduits, nozzles communicating with said conduits, said nozzles being mounted for reciprocating and rotating movement, rotatable spindles having provision for supporting forms on which plastic material is applied from said nozzles, means to effect unitary rotation of said spindles for a period at a given speed and for a subsequent period at a lower speed, means for swinging said nozzles radially of said spindles during the period of high speed rotation and moving said nozzles axially of said spindles during the period of low speed rotation and means to actuate said pistons in timed relation to the rotation of said spindles.

38. In combination a chamber, means for supplying plastic material to said chamber, a plurality of conduits traversing said chamber, pistons slidable in said conduits, nozzles communicating with said conduits, said nozzles being mounted for reciprocating and rotating movement, a rotatable table, a plurality of rows of spindles rotatably carried by said table, means to effect unitary rotation of said spindles for a period at a given speed and for a subsequent period at a lower speed, means periodically to rotate said table to bring said spindles into and out of operative relationship to the rotating means, said spindles having provision for supporting forms to which ribbons of plastic material are applied by said nozzles, means for reciprocating and rotating said nozzles and for actuating said pistons in timed relation to the rotation of said spindles.

39. In combination a chamber, means for supplying plastic material to said chamber, a plurality of conduits traversing said chamber, pistons slidable in said conduits, nozzles communicating with said conduits, said nozzles being mounted for reciprocating and rotating movement, a rotatable table, a plurality of rows of spindles rotatably carried by said table, means to effect unitary rotation of said spindles for a period at a given speed and for a subsequent period at a lower speed, means periodically to rotate said table to bring said spindles into and out of operative relationship to the spindle rotating means, said spindles having provision for supporting forms to which ribbons of plastic material are applied by said nozzles, means for swinging said nozzles radially of said spindles during the period of high speed rotation and moving said nozzles axially of said spindles during the period of low speed rotation, and means for moving said pistons in timed relationship to the rotation of said spindles.

40. In combination a chamber, means for supplying plastic material to said chamber, a plurality of conduits traversing said chamber, pistons slidable in said conduits, nozzles communicating with said conduits, said nozzles being mounted for reciprocating and rotating movement, a rotatable table, a plurality of rows of spindles rotatably carried by said table, means to effect unitary rotation of a row of spindles, a pair of pinions carried by one spindle of each row, coaxial segmental gears adapted successively to mesh with said pinions, means to rotate said segmental gears at uniform speed to effect rotation of said spindles for a period at a given speed and for a subsequent period at a lower speed, means periodically to rotate said table to bring the pinions of successive rows of spindles into operative relationship with said segmental gears, said spindles having provision for supporting forms to which ribbons of plastic material are applied by said nozzles, means for reciprocating and rotating said nozzles and for actuating said pistons in timed relation to the rotation of said spindles.

41. In combination a chamber, means for supplying plastic material to said chamber, a plurality of conduits traversing said chamber, pistons slidable in said conduits, nozzles communicating with said conduits, said nozzles being mounted for reciprocating and rotating movement, a rotatable table, a plurality of rows of spindles rotatably carried by said table, a means to effect unitary rotation of a row of spindles, a pair of pinions carried by one spindle of each row, coaxial segmental gears adapted successively to mesh with said pinions, means to rotate said segmental gears at uniform speed to effect rotation of said spindles for a period at a given speed and for a subsequent period at a lower speed, means periodically to rotate said table to bring the pinions of successive rows of spindles into operative relationship with said segmental gears, said spindles having provision for supporting forms to which ribbons of plastic material are applied by said nozzles, means for swinging said nozzles radially of said spindles during the period of high speed rotation and moving said nozzles axially of said spindles during the period of low speed rotation, and means for moving said pistons in timed relationship to the rotation of said spindles.

42. In combination a chamber, means for supplying plastic material to said chamber, a plurality of conduits traversing said chamber, pistons slidable in said conduits, a plurality of reciprocable and rotatable members, nozzles carried by said members, each member having a passage communicating with a corresponding nozzle and conduit, a plurality of rotatable spindles, said spindles having provision for supporting forms to which ribbons of plastic material are applied by said nozzles, means for effecting unitary rotation of said spindles for a period at a given speed and for a subsequent period at a lower speed, means for rotating and reciprocating said members and for actuating said pistons in timed relationship to the rotation of said spindles.

43. In combination a chamber, means for supplying plastic material to said chamber, a plurality of conduits traversing said chamber, pistons slidable in said conduits, a plurality of reciprocable and rotatable members, nozzles carried by said members, each member having a passage communicating with a corresponding nozzle and conduit, a plurality of rotatable spindles, said spindles having provision for supporting forms to which ribbons of plastic material are applied from said nozzles, means for effecting unitary rotation of said spindles for a period at a given speed and for a subsequent period at a lower speed, means for swinging said members during the rotation of said spindles at the low speed and for reciprocating said members during the rotation of said spindles at the high speed, and means for actuating said pistons in timed relationship to the rotation of said spindles.

44. In combination a chamber, means for supplying plastic material to said chamber, a plurality of conduits traversing said chamber, pistons slidable in said conduits, a plurality of members supported for reciprocation and rotation, nozzles carried by said members, each member having a passage communicating with the corresponding nozzle and conduit, a rotating table, a plurality of spindles rotatably carried by said table, said spindles having provision for supporting forms to which ribbons of plastic material are applied by said nozzles, means for effecting unitary rotation of said spindles for a given period at a given speed and for a subsequent period at a lower speed, means periodically to rotate said table to bring said spindles into and out of operative relationship to said spindle rotating means, means to reciprocate and rotate said members and to move said pistons in timed relationship to the rotation of said spindles.

45. In combination a chamber, means for supplying plastic material to said chamber, a plurality of conduits traversing said chamber, plungers slidable in said conduits, a plurality of members supported for reciprocation and rotation, nozzles carried by said members, each member having a passage communicating with the corresponding nozzle and conduit, a rotating table, a plurality of rows of spindles rotatably carried by said table, said spindles having provision for supporting forms to which ribbons of plastic material are applied by said nozzles, means for effecting unitary rotation of the rows of spindles, a pair of pinions of different diameters carried by one spindle of each row, coaxial segmental gears adapted successively to mesh with said pinions to effect rotation of the spindles for a period at a given speed and for a subsequent period at a lower speed, means periodically to rotate said table to bring the pinions of successive rows of spindles into and out of operative relationship to said segmental gears, and means to reciprocate and rotate said members and to move said plungers in timed relationship to the rotation of said spindles.

46. In combination a chamber, means for supplying plastic material to said chamber, a plurality of conduits traversing said chamber, pistons slidable in said conduits, nozzles communicating with said conduits, rotatable spindles having provision for supporting forms to which ribbons of plastic material are applied by said nozzles, a slide valve controlling said conduits, means to rotate said spindles, means to reciprocate said valve, means to move said nozzles radially and axially of said spindles, means to reciprocate said pistons, and means for actuating said four last named means in timed relation.

47. In combination a chamber, means for supplying plastic material to said chamber, a plurality of conduits traversing said chamber, pistons slidable in said conduits, nozzles communicating with said conduits, said nozzles being mounted for reciprocating and rotating movement, rotatable spindles having provision for supporting forms on which plastic material is applied from said nozzles, means to effect unitary rotation of said spindles for a period at a given speed and for a subsequent period at a lower speed, means for swinging said nozzles radially of said spindles during the period of high speed rotation and moving said nozzles axially of said spindles during the period of low speed rotation, a slide valve for controlling said conduits and means to actuate said pistons and said valve in timed relation to the rotation of said spindles.

48. In combination a chamber, means for supplying plastic material to said chamber, a plurality of conduits traversing said chamber, pistons slidable in said conduits, nozzles communicating with said conduits, said nozzles being mounted for reciprocating and rotating movement, a rotatable table, a plurality of rows of spindles rotatably carried by said table, means to effect unitary rotation of a row of spindles, a pair of pinions carried by one spindle of each row, coaxial segmental gears adapted successively to mesh with said pinions, means to rotate said segmental gears at uniform speed to effect rotation of said spindles for a period at a given speed and for a subsequent period at a lower speed, means periodically to rotate said table to bring the pinions of successive rows of spindles into operative relationship with said segmental gears, said spindles having provision for supporting forms to which ribbons of plastic material are applied by said nozzles, means for swinging said nozzles radially of said spindles during the period of high speed rotation and moving said nozzles axially of said spindles during the period of low speed rotation, a slide valve controlling said conduits, and means for reciprocating said valve and moving said pistons in timed relationship to the rotation of said spindles.

49. In combination a chamber, means for supplying plastic material to said chamber, a plurality of conduits traversing said chamber, plungers slidable in said conduits, a plurality of members supported for reciprocation and rotation, nozzles carried by said members, each member having a passage communicating with the corresponding nozzle and conduit, a rotating table, a plurality of rows of spindles rotatably carried by said table, said spindles having provision for supporting forms to which ribbons of plastic material are applied by said nozzles, means for effecting unitary rotation of the rows of spindles, a pair of pinions of different diameters carried by one spindle of each row, coaxial segmental gears adapted successively to mesh with said pinions to effect rotation of the spindles for a period at a given speed and for a subsequent period at a lower speed, means periodically to rotate said table to bring the pinions of successive rows of spindles into and out of operative relationship to said segmental gears, means to reciprocate and rotate said members and to move said plungers in timed relationship to the rotation of said spindles, a slide valve controlling said conduits, and means for reciprocating said slide valve in timed relationship to the rotation of said spindles.

In testimony whereof, we have signed our names to this specification.

JOHN E. PRESTON.
SAMUEL SOKOLOW.